Figure 1:
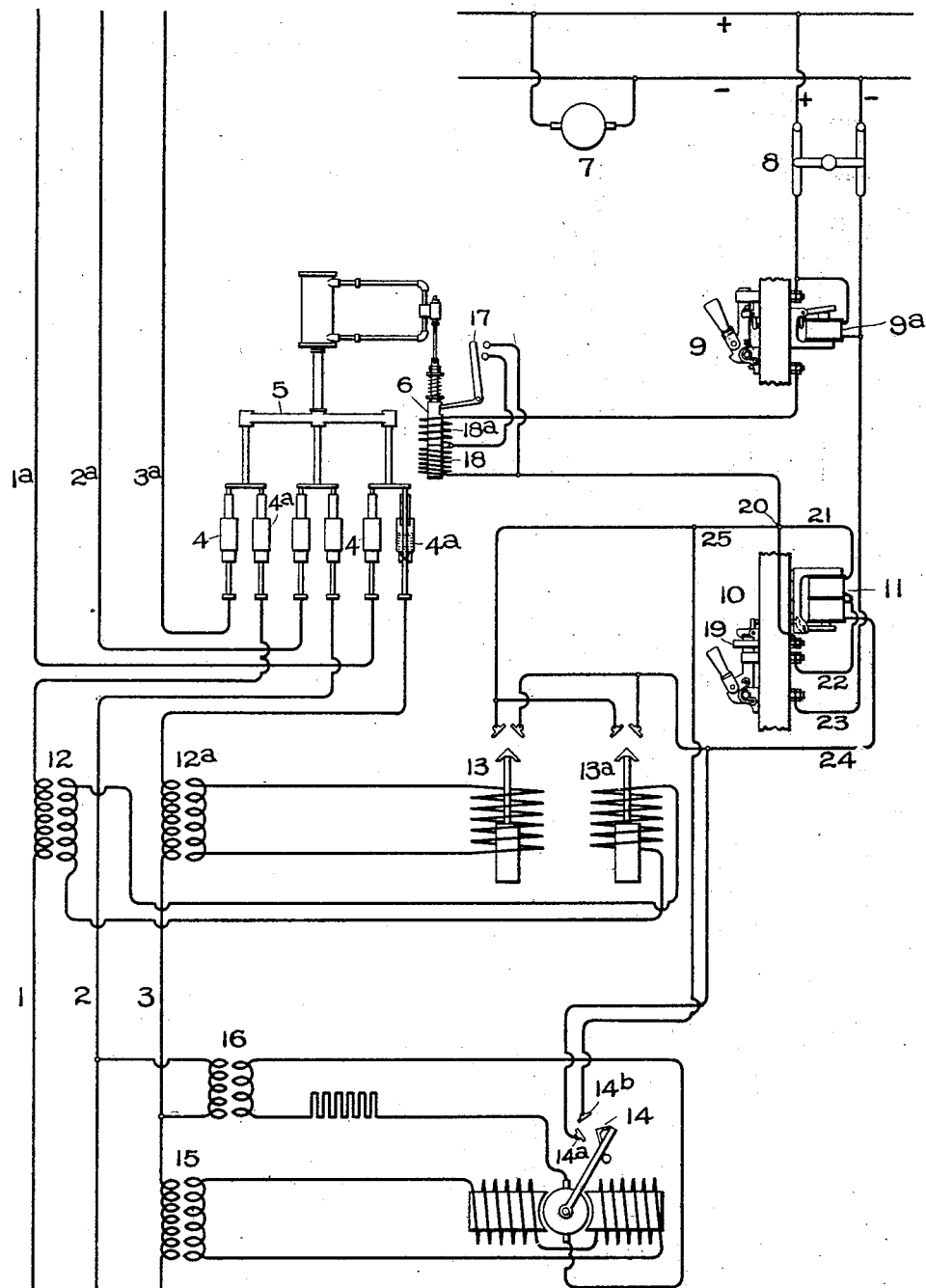

No. 716,540. Patented Dec. 23, 1902.
E. M. HEWLETT.
SWITCHING APPARATUS FOR ALTERNATING CURRENTS.
(Application filed Nov. 21, 1900.)
(No Model.) 2 Sheets—Sheet 1.

Witnesses:
Lewis P. Abell,
Benjamin B. Hull.

Inventor,
Edward M. Hewlett,
by Albert G. Davis
Atty.

No. 716,540. Patented Dec. 23, 1902.
E. M. HEWLETT.
SWITCHING APPARATUS FOR ALTERNATING CURRENTS.
(Application filed Nov. 21, 1900.)
(No Model.) 2 Sheets—Sheet 2.
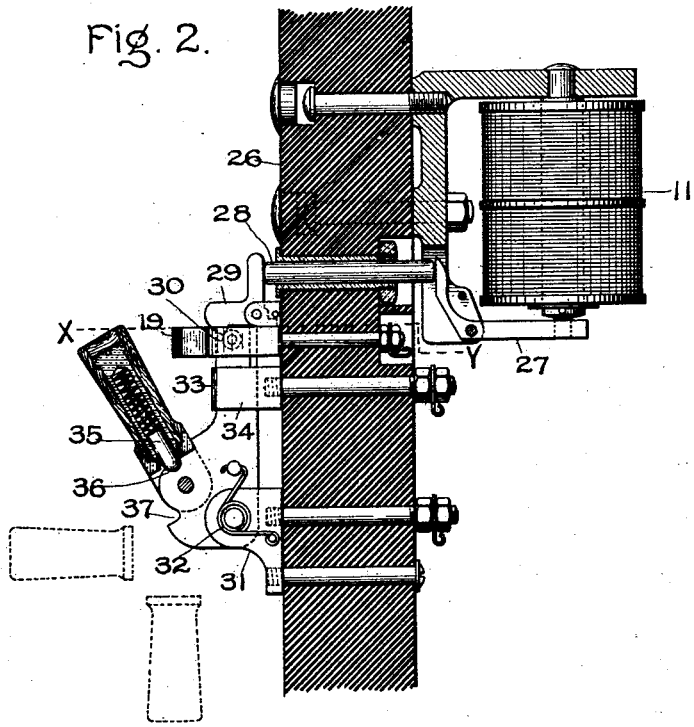
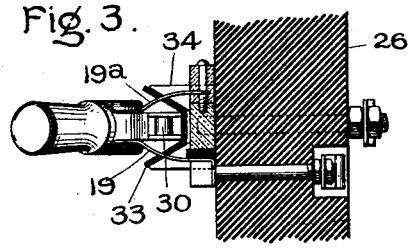
Witnesses:
Lewis F. Abell.
Benjamin B. Hull.
Inventor,
Edward M. Hewlett,
by Albert G. Davis
Atty.

UNITED STATES PATENT OFFICE.

EDWARD M. HEWLETT, OF SCHENECTADY, NEW YORK, ASSIGNOR TO GENERAL ELECTRIC COMPANY, A CORPORATION OF NEW YORK.

SWITCHING APPARATUS FOR ALTERNATING CURRENTS.

SPECIFICATION forming part of Letters Patent No. 716,540, dated December 23, 1902.

Application filed November 21, 1900. Serial No. 37,242. (No model.)

*To all whom it may concern:*

Be it known that I, EDWARD M. HEWLETT, a citizen of the United States, residing at Schenectady, county of Schenectady, State of New York, have invented certain new and useful Improvements in Switching Apparatus for Alternating Currents, (Case No. 1,675,) of which the following is a specification.

This invention relates to switching apparatus for controlling high-potential electric currents. In operating currents of this kind, and particularly alternating currents of large amperage, it is advantageous not only to insure a safe opening of the circuit when the conditions require it, but also to permit such control to be effected by automatic means or by hand under overload or underload conditions of service or in case of a short circuit on the line or other part of the system.

It is the object of my invention to provide an apparatus which will insure these ends.

The invention is of particular advantage in central or distributing stations, where the large volumes of current handled necessitate the utmost care in preventing damage to the expensive apparatus.

In carrying out my invention I provide electrically-controlled switches for disconnecting any desired pair of distributing mains or feeders and control the governing-circuit by means of switches which can be operated either by hand or automatically and which will indicate whether the operation has been by hand or by an automatic agency. In an alternating system the automatic action is controlled by means of magnetic devices controlled by current-transformers interposed in the alternating circuit, a sufficient number being employed to insure the operation of the circuit-breaker on abnormal load in any pair of mains. In case of a short circuit I insure the operation of the circuit-breaker by means of a device which I term a "reverse-current relay," the two relatively movable magnetic elements of which are responsive to current and electromotive force, respectively, in the lines to insure opposite directions of movement in harmony with opposite directions of delivery of energy. Where both magnetic elements of a device or relay of this character are connected in the same relation to the same circuit—that is to say, if both are current-coils or both potential coils—the device does not respond in an opposite sense to opposite directions of flow of energy, since each wave of current produces the same direction of torque irrespective of the direction of flow. Where one element, however, is connected across a pair of the mains, as the potential coil, and the other in series, an opposite direction of energy flow with respect to the distributing-wires insures an opposite direction of torque and permits the device to respond.

The novel features of my invention will be more particularly described hereinafter and will be definitely indicated in the claims appended to this specification.

In the accompanying drawings, which illustrate my invention, Figure 1 is a diagram of a central or distributing station system embodying my improvements; and Figs. 2 and 3 are details showing the construction of one of the combined automatic and hand-operated switches forming part of my invention, Fig. 3 being a section on a plane indicated by the line $x\,y$ of Fig. 2.

Referring first to Fig. 1: 1, 2, and 3 represent a polyphase circuit adapted to be connected or disconnected with a distributing-circuit $1^a\ 2^a\ 3^a$ by means of a multipolar oil-switch or circuit-breaker. This switch in its essential elements comprises an organization having two poles per phase of current, adapted to be connected or disconnected under oil contained in a series of oil-pots 4 $4^a$, the movable elements of which are controlled by a common cross-head 5, pneumatically operated, the movements being governed by a slide-valve controlled by a magnetically-operated plunger 6. The construction of this switch will be sufficiently evident for the purposes of the present description from the drawings. The details, however, are similar to those described in a prior application filed by me, Serial No. 4,314, February 7, 1900. The movements of the switch are governed by a coil or coils acting on the plunger 6 and connected in a control-circuit supplied from an auxiliary direct-current generator 7. This may be a low-tension direct current of one hundred and twenty-five volts. The switch-circuit may be connected with a source of direct current by means of a hand-operated switch 8 and underload and overload switches 9 10, respectively, adapted to be operated either by hand or automatically, if the current conditions require. The switch 9 may be governed by an underload-coil 9$^a$ in parallel with the direct-current mains and the switch 10 by a differential coil 11, responsive to an overload on any pair of the main wires or to a reversal of direction of energy flow, as hereinafter described. The former condition is effected by means of current-transformers 12 12$^a$ in series with the alternating-current mains, as many such being employed as will insure the tripping of the circuit-breaker upon an overload on any pair of wires. For a triphase system two transformers are sufficient. The secondaries of these transformers connect with the operating-coils of relays 13 13$^a$, which may consist of solenoids containing plungers, as indicated in the diagram, adapted to bridge contacts controlling the tripping-magnet 11. In the specific arrangement shown in the drawings this is effected by means of a closure of the lower section of coil 11 of this magnet, which acts differentially with respect to the upper section and demagnetizes the magnet when either of the relays 13 or 13$^a$ operates, as hereinafter fully set forth. The upper section of the differential coil is normally in circuit with the direct-current source 7, being supplied in series with the tripping-coil of the main circuit-breaker. The lower section of the coil 11 is connected in parallel relation with the upper section, but is differential in its relation thereto in its effect on the core, its circuit being normally interrupted at the contacts governed by the alternating-current relays 13 13$^a$ 14, the former of which respond, as above stated, to overload conditions. The latter responds to a reversal of flow of energy in the system and may be constructed like a direct-current motor, all parts of the core being laminated, one element being supplied by a current-transformer 15 in series with the line and the other by a potential-transformer 16 in parallel relation to the line. But one of these relays has been shown. As many, however, may be employed as will effect the safety of every phase of the line-circuit. Current may be led in by two brushes bearing on ring-contacts. So long as energy flows in one direction—that is to say, when the distributing-wires 1$^a$ 2$^a$ 3$^a$ are absorbing energy from the supply-mains 1 2 3—the torque of this device will be in one direction; but if a short circuit be established in the line at a point nearer the generator than the relay a back-flow of energy from the rotary converter and other distributing apparatus supplied by the circuit 1$^a$ 2$^a$ 3$^a$ will reverse the magnetization of the field-poles of the motor without, however, reversing the armature, whose feeding-transformer is in parallel relation to the mains. Thus a relative reversal of the poles effected by a change in the direction of the energy flow reverses the torque on the armature and operates the relay. This relay will normally stand open, as indicated in the diagram, being held in this position by the torque on its armature due to the normal direction of energy flow from the supply-generator; but upon accidental reversal from the causes above indicated the armature will be drawn up and contacts 14$^a$ 14$^b$ bridged, these contacts being connected in the same relation to the tripping-coil 11 as the contacts controlled by the relays 13 13$^a$. The tripping-coil for the main circuit-breaker controlling the core 6 is also composed of two sections, one of high and the other of low resistance, to the end that when the circuit-breaker is closed it may be held closed by the action of the core without a great waste of energy. One section is therefore made of high resistance and the other of low resistance, the parts being arranged so that when the switch is closing the low-resistance section only is cut in and after it is closed both sections are in series. This is effected by means of a short-circuiting bridge 17, which opens a normal short circuit for the high-resistance coil 18 when the main switch is closed. This bridge is controlled by a lever struck by a stop on the core 6 or attached thereto when the latter has completed its movement in moving the valve which governs the main switch, thereby utilizing the full pull of the coil until the switch has been operated. This part of the invention has been fully described in my prior application above referred to and need not be further elaborated here.

It will be noted that the upper section of the differential coil 11 is in series relation to the coil 18 18$^a$, and in order to cut out this resistance when the switch 10 is being closed I provide an auxiliary contact 19 on this switch, by which the coil 11 is short-circuited momentarily, thereby putting the full potential upon the operating-coil 18$^a$ of the oil-switch.

Tracing the condition of the circuits with all the switches closed, that being the normal condition of operation, the contacts of switches 9 and 10 are held shut by direct current passing from the positive main, by way of the left blade of switch 8, through the contacts of switch 9, through the operating-coil 18 18$^a$ to the point 20, thence by wire 21 to the upper section of coil 11, by wire 22 to the blade of switch 10, by wire 23 back to the negative wire of the source of direct-current supply. Across this circuit is the tripping-coil 9$^a$ of the underload circuit-breaker 9, serving to open the switch if the exciter or auxiliary generator fails. In case any of the devices 13, 13$^a$, or 14 act, the lower section of the differential coil 11 is cut in by way of wires 24 and 25, the wires 22 and 23 forming a common return for the two coils.

The coil 11 is composed of two sections which constitute a single winding, one end of which connects with the conductor 21, the other with conductor 24, the middle point connecting with conductor 22, as indicated in Fig. 1; but, as will be evident from the operation hereinbefore described, when the lower section is closed it is put in parallel with respect to the circuit supplied by the exciter or auxiliary generator 7 with the upper section, but reversely connected, so as to act in a demagnetizing manner, all of which is clear from Fig. 1, where the two conductors 25 and 24 form a pair of common leads to the several pairs of relay-contacts 13, 13ª, and 14.

The construction of this switch is more fully indicated in Figs. 2 and 3, in which 11 represents the differential coil, being mounted in a cast-iron frame lagged fast by screws to a supporting-board 26, of slate or other heat-refractory insulating material. This magnet is provided with a pivoted weighted armature 27, hung so as to gravitate away from the core. The armature carries an angular arm bearing against a pin 28, adapted to slide in a brass bushing mounted in the supporting-board. Coöperating with the front end of this pin is an angular latch 29, the nose of which is beveled and adapted to engage a roller 30, mounted on the switch-blade. The latter is pivoted in a bracket 31 and controlled by a spring 32, tending to open it. The switch-blade carries a flexible bridging-contact 33, (see Fig. 3,) spanning a forked contact 34, having a terminal connection at the back of the board. The bracket 31 has also a terminal connection to the back of the board. The temporary contact 19 is formed of two leaf-springs of phosphor-bronze 19 19ª, which have a common terminal at the back of the board and when the switch is closed, as indicated in Fig. 2, arch over the same and do not form a contact therewith, as indicated in Fig. 3; but when the switch is in the act of being closed the blade comes between the contacts 19 19ª and effects a temporary connection, short-circuiting the coil 11, as hereinbefore described. The switch is provided with a handle capable of relative movement with relation to the blade, the handle containing a spring-pressed detent 35, nesting in the handle and adapted to engage one of two recesses 36 37 in the butt of the blade. The recess 36 is so shaped that when the handle is grasped to manually open the switch the pin will ride out of the notch 36 and engage notch 37, so that when the switch is manually opened the handle will occupy a vertical position, as shown in dotted lines. If, however, the device is automatically tripped the spring 32 will leave the handle in a horizontal position, as indicated in dotted lines, the spring-pin 35 preventing the handle from leaving the notch. Thus there is provided an organization by which an indication is given as to whether the switch has been released by hand or has been released automatically, so that the central-station operator by glancing down the switchboard may recognize at once which controlling-switches have been operated automatically and which by hand, thereby affording him valuable information with reference to the condition of the circuits. In case of an automatic release the armature 27 is forced back by the pressure of the latch 29, unlatching the switch-lever and permitting the spring 32 to throw the switch open.

What I claim as new, and desire to secure by Letters Patent of the United States, is—

1. The combination of an alternating-current circuit, of a high-potential circuit-breaker therefor, an electric control-circuit for the circuit-breaker, devices responsive to overload in the system governing said control-circuit, and a relay also governing said circuit, having one member responsive to line-current and the other to line potential.

2. The combination with an alternating-current circuit, of a high-potential circuit-breaker therefor, an electric control-circuit for the circuit-breaker closed when the circuit-breaker is closed, a switch therein, and current-responsive devices in the alternating-current circuit for operating the switch.

3. The combination with an alternating-current circuit, of a high-potential circuit-breaker therefor, a local circuit controlling the circuit-breaker, and automatic electric devices in the main and local circuits respectively responsive to abnormal electric variations, each governing the operation of the circuit-breaker.

4. The combination with an alternating-current circuit, of a circuit-breaker therefor, a local circuit for tripping the circuit-breaker, an underload-coil in the local circuit, relays responsive to line conditions, and connections for opening the switch when the relays are actuated.

5. The combination with an alternating-current circuit, of a high-potential circuit-breaker therefor, a coil governing the circuit-breaker, a local circuit including said coil, and an automatic circuit-breaker in said local circuit and connections for short-circuiting its operating-coil when the circuit-breaker is being closed.

6. The combination with an electric circuit, of a switch, means for operating it automatically or by hand, said switch having a movable connection between the handle and contact, and means for effecting a different relative position of the two when the device is released automatically or by hand.

7. In an electric switch normally biased to open, means for opening the same automatically or by hand, a retaining-coil, a handle relatively movable to the movable contact, and means for preventing said relative movement when the switch opens automatically.

8. In an electric switch biased to operate in one direction, an operating-coil, and a handle having a slip connection with the switch-blade adapted to move with the blade when operated by the coil but to slip on the same when moved by hand.

9. An electric switch having a slip connection between the handle and blade, and an operating-coil, the connection-resisting slip for automatic operation but permitting it for hand operation.

In witness whereof I have hereunto set my hand this 19th day of November, 1900.

EDWARD M. HEWLETT.

Witnesses:
BENJAMIN B. HULL,
FRED RUSS.